F. A. NAUTS.
PERAMBULATOR.
APPLICATION FILED OCT. 13, 1913.
1,158,710.
Patented Nov. 2, 1915.
2 SHEETS—SHEET 2.
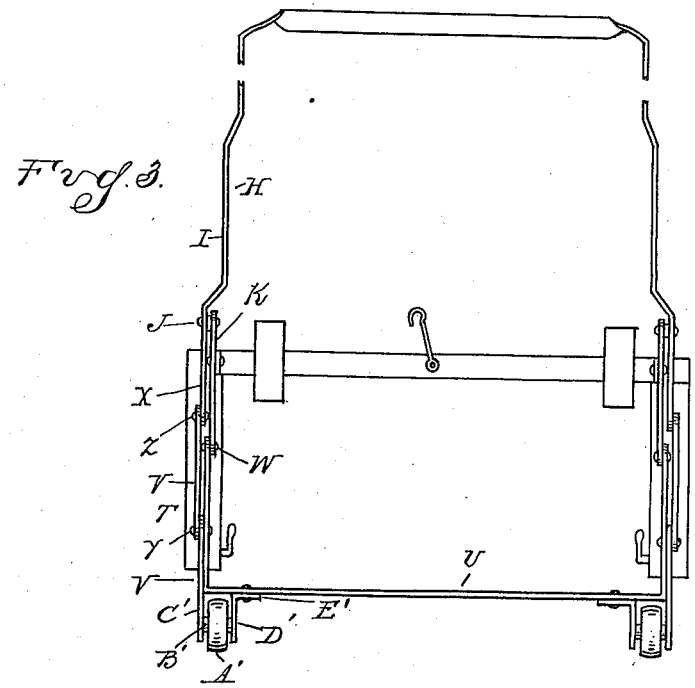
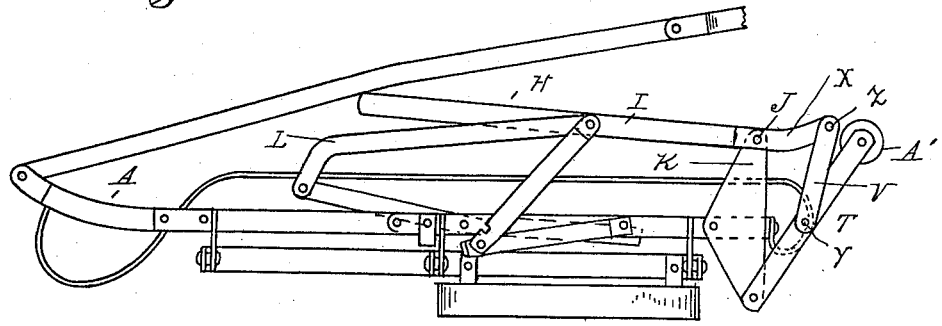
Witnesses
Inventor
Frank A. Nauts,
By
Atty

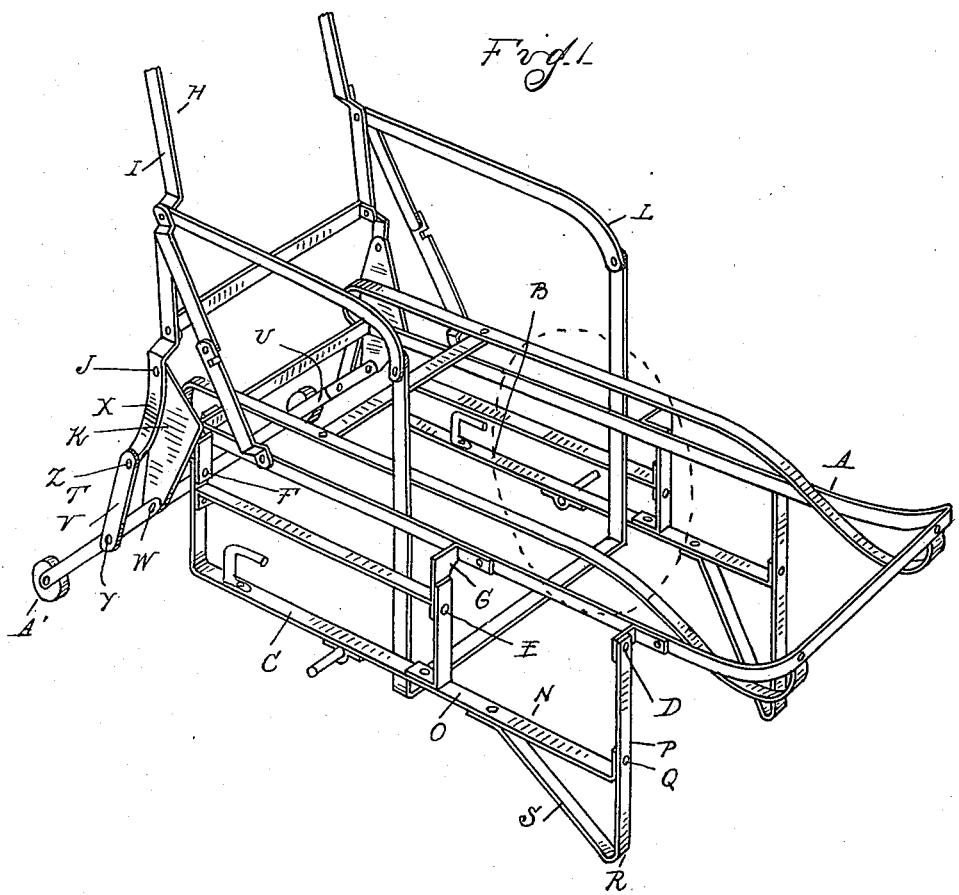

UNITED STATES PATENT OFFICE.

FRANK A. NAUTS, OF TOLEDO, OHIO, ASSIGNOR TO GENDRON WHEEL COMPANY, OF TOLEDO, OHIO, A CORPORATION OF OHIO.

PERAMBULATOR.

1,158,710. Specification of Letters Patent. Patented Nov. 2, 1915.

Application filed October 13, 1913. Serial No. 795,002.

*To all whom it may concern:*

Be it known that I, FRANK A. NAUTS, a citizen of the United States of America, residing at Toledo, in the county of Lucas and State of Ohio, have invented certain new and useful Improvements in Perambulators, of which the following is a specification, reference being had therein to the accompanying drawings.

The invention relates to perambulators and more particularly to perambulators of the two-wheel type.

The invention resides in the peculiar construction and arrangement of the rests or supports for the seat frame.

In the drawings,—Figure 1 is a perspective view of a perambulator embodying the invention; Fig. 2 is a side elevation showing the parts in their folded relation; and Fig. 3 is a rear elevation thereof.

A designates the seat frame and B C the wheel frames pivoted at D E F to brackets G attached to the frame A so as to fold inwardly beneath the frame A.

H is the back frame formed of a bail-shaped member having the legs I thereof pivoted at J to brackets K rigidly connected to the frame A.

L are arm rests attached to the back frame and so arranged in relation and connected to the main frame and the wheel frames that upon folding the back, the wheel frames are folded beneath the main frame in the usual manner.

I have devised a simple and novel manner of forming such supports, while at the same time providing a structure that has the desired strength and one which will tend to prevent sidewise tipping of the perambulator. Thus in the particular form of the invention illustrated in the drawings, the wheel frames are each formed with a forward extension N that has the bar O thereof forming a continuation of the bottom of the main portion of the wheel frame, and which is provided at its forward end with an arm P which is attached intermediate its ends as at Q, to the bar O. The member P projects below the bar O and is rebent at R, forming a rounding bearing for engaging the ground, walk or the like. The rebent portion S extends rearwardly and is secured to the member O, forming a brace for the lower end of the member P. Such an arrangement provides a very rigid structure, and as the support is formed of rests arranged upon opposite sides of the frame A, the perambulator when resting upon the wheels and the members N, is very stably supported. These forward rests are of a length to be positioned at a distance above the ground when the frame A is horizontal, so as not to interfere with the travel of the perambulator when in use. Also since the extensions N are carried by the wheel frames, when the latter are folded the rests are also folded beneath and in immediate proximity to the main frame A, as will be seen upon reference to Fig. 2.

Rearwardly of the wheels is a bearing portion T which serves to assist in drawing the carriage over curbstones or the like, and also to prevent the perambulator from tipping over backward. This bearing portion is attached to the main frame, in contradistinction to being carried by the wheel frames, and in the form illustrated in the drawings comprises a bail-shaped frame U having the free ends thereof pivotally connected at W to the brackets K. This bail-shaped frame is attached by legs V to extensions X of the back frame H, the legs V being pivoted at Y Z respectively to the frame U and the extensions X. By this arrangement, upon the folding of the back frame the bearing portion U is folded into the position shown in Fig. 2, thereby eliminating a projection extending from one end of the frame when the perambulator is folded. The frame U is provided adjacent opposite ends thereof with bearing portions proper which preferably, though not necessarily, are composed of rollers A'. These rollers are mounted upon a shaft B' which is carried by spaced members C' D', the member C' being suitably connected to the side of the U-shaped frame while the member D' has a laterally-extending portion E' riveted to the base of the frame U.

With the construction heretofore described it will be noted that the support forwardly of the wheels and the bearing rearwardly of the wheels are both arranged in the folded position of the perambulator so as not to form an objectionable projection, and in the particular type illustrated, the folding of the support and the bearing portion is effected upon the folding of the back frame.

While I have shown and described the preferred form of my invention, I do not consider the invention limited to the particular structure illustrated.

What I claim as my invention is:

1. In a two-wheel perambulator, the combination with the main frame, wheel frames upon opposite sides of the main frame and connected thereto to fold beneath the main frame, wheels carried by the wheel frames, and a rest for each wheel frame comprising a portion forming an extension of the bottom of the wheel frame, a member pivotally connected at one end to the main frame and attached to said portion, said member being provided with an extension and said extension having a rebent part connected to said portion.

2. In a two-wheel perambulator, the combination with the main frame, wheel frames upon opposite sides of the main frame and connected thereto to fold beneath the main frame, wheels carried by the wheel frames, a rest composed of a member pivotally connected to the main frame forwardly of the axes of the wheels to fold therebeneath and attached to the wheel frame.

3. In a two-wheel collapsible perambulator, the combination with a main frame, wheel frames upon opposite sides of the main frame and operatively connected thereto to fold in relation to the main frame, wheels carried by the wheel frame, a bearing arranged rearwardly of the axes of the wheels, and a connection between said bearing and the main frame permitting the folding of said bearing upon the collapsing of the perambulator.

4. In a two-wheel collapsible perambulator, the combination with the main frame, wheel frames upon opposite sides of the main frame and connected thereto to fold in relation to the main frame, a bearing arranged rearwardly of the axes of the wheels comprising bearings proper arranged adjacent opposite sides of the main frame and adapted to be folded upon collapsing of the perambulator.

5. In a two-wheel collapsible perambulator, the combination with the main frame, wheel frames upon opposite sides of the main frame and connected thereto to fold in relation to the main frame, a bearing arranged rearwardly of the axes of the wheels comprising a member pivotally carried by the main frame, a bearing proper carried by said member, and means for folding said bearing upon the collapsing of the perambulator.

6. In a two-wheel collapsible perambulator, the combination with the main frame, wheel frames upon opposite sides of the main frame and connected thereto to fold in relation to the main frame, a bearing arranged rearwardly of the axes of the wheels including a foldable frame, a back, and a connection between said foldable frame and the back for folding said frame upon the folding of the back.

7. In a two-wheel collapsible perambulator, the combination with the main frame, wheel frames upon opposite sides of the main frame and connected thereto to fold in relation to the main frame, a foldable frame connected to the main frame independent of the wheel frames, a foldable back connected to the main frame, and a connection between said foldable frame and the back for effecting the folding of said foldable frame upon the folding of the back.

8. In a two-wheel collapsible perambulator, the combination with the main frame, wheel frames upon opposite sides of the main frame and connected thereto to fold in relation to the main frame, a back carried by the main frame and foldable in relation thereto, a foldable frame pivotally attached to the main frame in rear of the axles of the wheels, and links connecting the back with the foldable frame whereby upon the folding of the back said foldable frame will be collapsed.

9. In a two-wheel perambulator, the combination of the main frame, a tongue at the forward end of the main frame, a seat facing toward the tongue, wheel frames upon opposite sides of the main frame and pivotally connected thereto to fold therebeneath, wheels carried by the wheel frames and a rest carried by each wheel frame and adapted to be folded beneath the main frame upon the folding of the wheel frames, said rests being positioned forwardly of the axes of the wheels and adapted to coöperate with the wheels to support the perambulator in upright operative position.

10. In a two-wheel perambulator, the combination of the main frame, a tongue at the forward end of the main frame, a seat facing toward the tongue, wheel frames upon opposite sides of the main frame, each of said wheel frames comprising arms pivotally connected adjacent their upper ends to the main frame to fold therebeneath, and a cross-connection between said arms, one of said arms being positioned forwardly of the axes of the wheels and having a downward extension forming a rest, said rests being adapted to coöperate with the wheels to support the perambulator in upright operative position.

11. In a two-wheel perambulator, the combination of the main frame, wheel frames upon opposite sides of the main frame, each of said wheel frames comprising arms pivotally connected adjacent their upper ends to the main frame to fold therebeneath, and a cross-connection between said arms, axles mounted on said cross-connections, wheels on said axles, each of said wheel frames having the front arm thereof positioned a considerable distance forwardly of the axle and said arm having an integral extension projecting below the plane of the axle and forming a rest, said rests being adapted to coöperate with the wheels to support the perambulator in upright operative position.

In testimony whereof I affix my signature in presence of two witnesses.

FRANK A. NAUTS.

Witnesses:
WM. J. SCHNEIDER,
J. WEIR COOVER.

Copies of this patent may be obtained for five cents each, by addressing the "Commissioner of Patents, Washington, D. C."